UNITED STATES PATENT OFFICE.

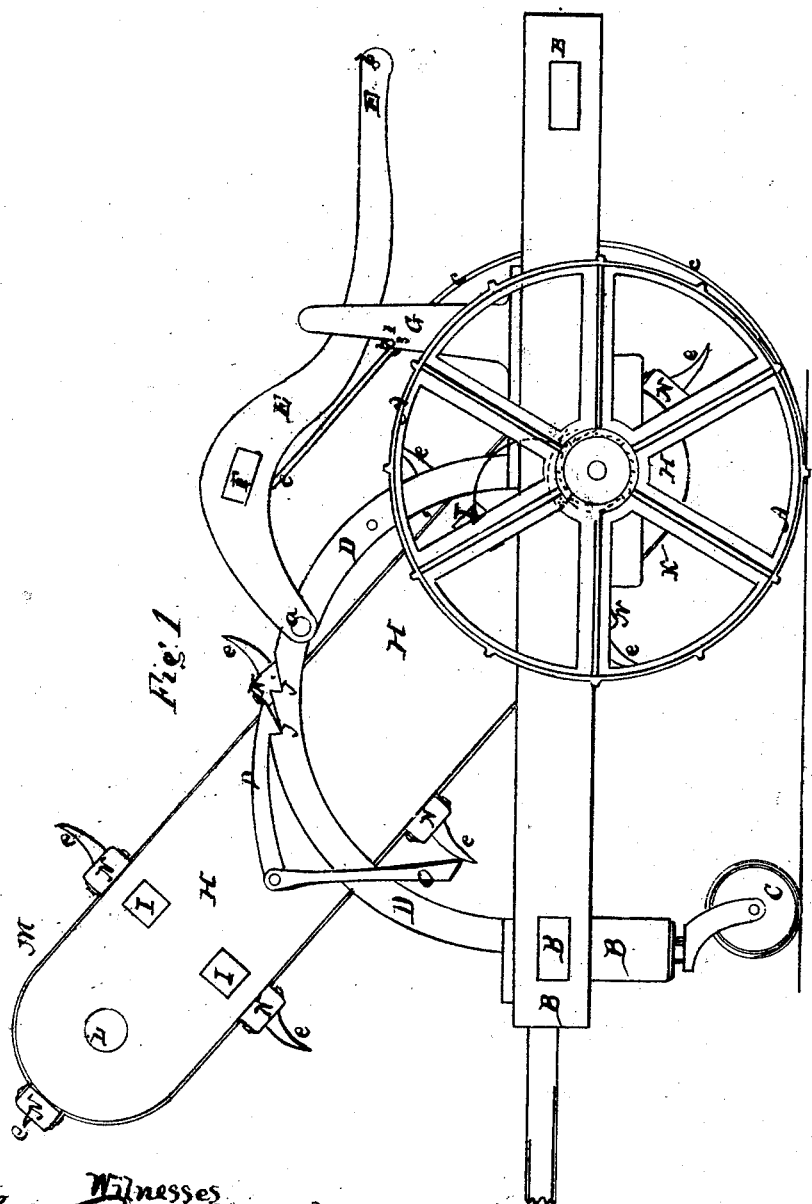

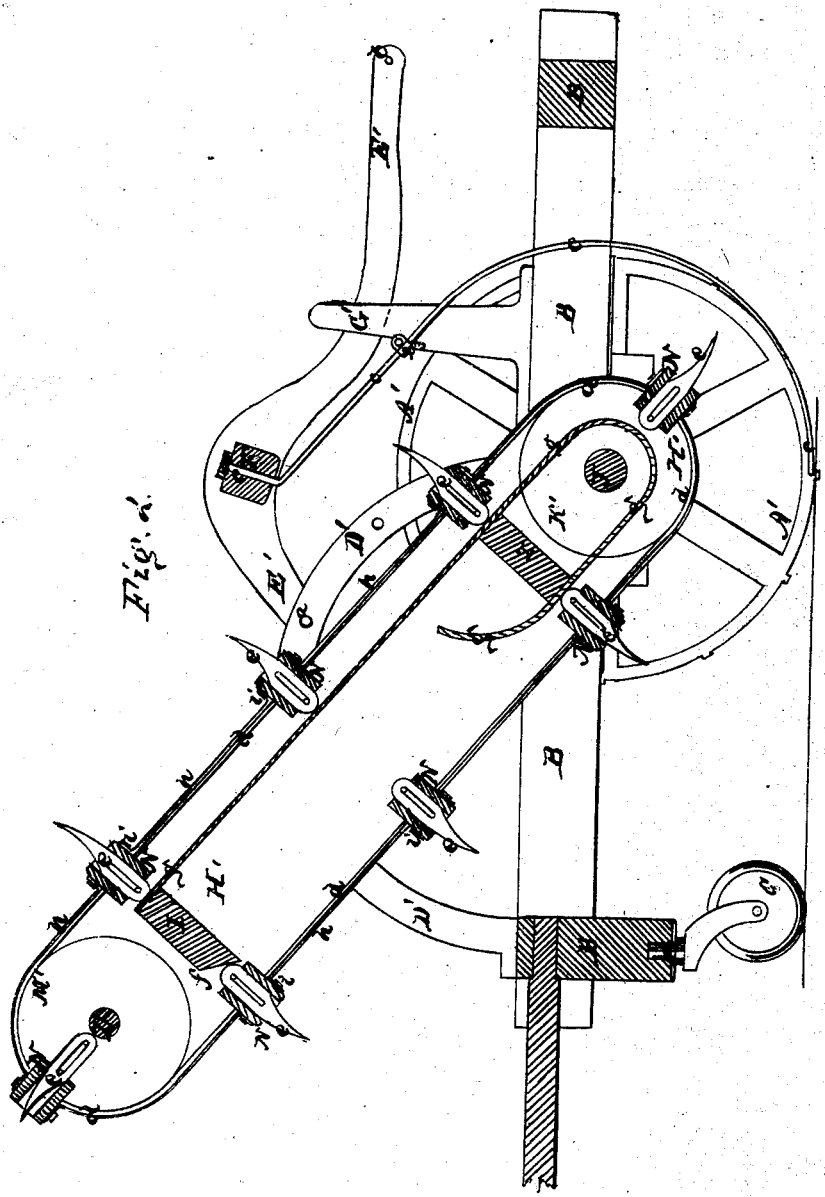

ANDREW ROYSE AND MATTHIAS K. MORRIS, OF LE ROY, PENNSYLVANIA.

IMPROVEMENT IN HAY RAKERS AND LOADERS.

Specification forming part of Letters Patent No. 71,792, dated December 3, 1867.

*To all whom it may concern:*

Be it known that we, ANDREW ROYSE and MATTHIAS K. MORRIS, of Le Roy, in the county of Bradford and State of Pennsylvania, have invented certain new and useful Improvements in Machines for Raking and Loading Hay and Similar Material; and we do hereby declare the following to be a full, clear, and exact description of the same, reference being had to the accompanying drawings, making a part of this specification, in which—

Figure 1 represents a side elevation of the machine, and Fig. 2 represents a vertical longitudinal section through the same.

Similar letters of reference where they occur in the separate figures denote like parts parts in both of the drawings.

Our invention relates to a machine for raking and loading or pitching hay; and it consists in the manner in which we have arranged and combined the rake and elevator, so as to adapt them to the work designed to be accomplished and to the ground over which the machine is worked.

To enable others skilled in the art to make and use our invention, we will proceed to describe the same with reference to the drawings.

On a pair of carrying-wheels, A A', is arranged a main frame, B, which, at its front end, may be supported by a caster-wheel, C, so that it may be readily turned or follow the wagon to the rear of which it is attached. On the main frame B are placed two arched pieces, D D', to which are pivoted, as at $a$, two bent levers, E E', which levers are united or braced by the rake-head F, and by a rod, $b$, so that they shall move or swing together. In the rake-head F is inserted any suitable number of bent steel-wire rake-teeth $c$, that curve rearward and downward until their points come in close proximity to the ground. The levers E E' pass through slots in standards G G', arranged on the main frame, so that as they rise and fall by the rake-teeth meeting any inequalities in or on the surface of the ground they shall do so in said slots, and thus act freely and truly without cramping. Ordinarily the weight of the levers and the teeth connected to them will be sufficient to bring the teeth down after they have been raised up by any interposing obstacle and hold them to their work; but, if not, the ends of the levers may be weighted, or, which amounts to the same thing, spiral springs, or rubber-band springs, may be attached to them and to the main frame to draw and more rigidly hold them down or to their work. On the axle J of the supporting-wheels, inside of the main frame, are hung or hinged the two side pieces, H H', of the conveyer-frame, said side pieces being braced or united by cross-pieces I I, extending from one to the other and forming the conveyer-frame. There are also arranged upon the axle J two pulley or band wheels, K K'; and upon a turning shaft, L, at the upper end of the conveyer-frame, are also placed two pulley or band wheels, M M', and around these band-wheels K M and K' M' are placed endless belts or bands $d$, which are driven from the axle J, that turns with the carrying-wheels A A', and which wheels thus become driving-wheels also. Fastened to these bands $d$ there are cross-pieces N, which extend across from one to the other, and in these cross-pieces N is hung a series of teeth, $e$, by means of a slot and pin, as distinctly seen in Fig. 2, so that the teeth, after they have carried their charge of hay up to the end of the conveyer, may drop or pass within the conveyer, and thus release themselves from the hay and allow it to pass into the wagon, or to be readily removed from the conveyer by the attendant. The tooth or teeth at the extreme upper end of the conveyer are shown as having passed in, so as not to project far enough to hold onto the hay. As the teeth pass around under the conveyer they will drop out as far as the slot and pin will allow them to do; or if they fail to drop out by being clogged in any way, they will come against the inclined edge $f$ of the upper cross-piece, I, and this will force them out. Within the conveyer-frame there is a piece of sheet metal, $g$, which forms a guide and bed for the butts or heads of the teeth to move upon or against. This sheet-metal bed $g$ is fastened at its upper end to the upper cross-piece, I; thence it passes down and is curved around the axle J, and returns underneath the lower cross-piece, and is then bent or curved upward, as seen in Fig. 2. The object of this plate or bed is as follows: Just before the carrying-teeth $e$ reach the rake-teeth $c$ to take the hay off from the latter, and to carry it up to and deliver it in the wagon, the butts of the teeth take against this apron or bed, which pushes them out, and holds them out until they arrive at or near the point of delivery at the upper end of the conveyer, where they pass beyond said bed, and the moment they do so, there being nothing to hold them out, they drop within the conveyer. Pieces of cloth or other close flexible material $h$ extend from one cross-piece N to the next adjacent one throughout the series, and may be tacked thereto, as at $i$. These pieces make the conveyer tight, and prevent any dirt, seeds, &c., from falling into and clogging the moving parts of the machine.

To raise and lower the conveyer at pleasure there is a lever, O, connected to a rod or shaft that passes through the conveyer-frame, and upon each end of this rod, and just outside of the side pieces, H H', are arranged hooks P, that catch into notches $j$ in the curved pieces D, and thus hold the conveyer at any adjusted height. By means of the lever O the hooks can be thrown out, and the conveyer will then drop downward.

The rake-teeth $c$ are braced and kept in proper position by a wire or rod, 1, Fig. 1, which extends clear across the series, and to which said teeth are fastened by a clip, as shown at 2, Fig. 2, and the wire or rod 1, extending beyond the uprights G, rests upon shoulders 3 in said uprights, and thus prevents the teeth $c$ from descending below a given point.

Having thus fully described our invention, what we claim is—

1. In combination with the rake-teeth hinged to the main frame by levers E E', the slotted and shouldered standards G G', for guiding the rake in its rising and falling motions and sustaining it from going too low, substantially as described.

2. We also claim, in combination with a rake for gathering the hay, a conveyer for taking and carrying up the hay, when used with teeth that are thrown out of and drop into said conveyer, first to take and carry up and then to deliver the hay, substantially as described.

3. We also claim, in combination with carrying-teeth that are projected from and drop within the conveyer, the metal bed $g$, for guiding and holding the teeth, substantially as described.

ANDREW ROYSE.
MATTHIAS K. MORRIS.

Witnesses:
H. W. PARKHURST,
JOHN P. HARTMAN.